Patented Oct. 19, 1948

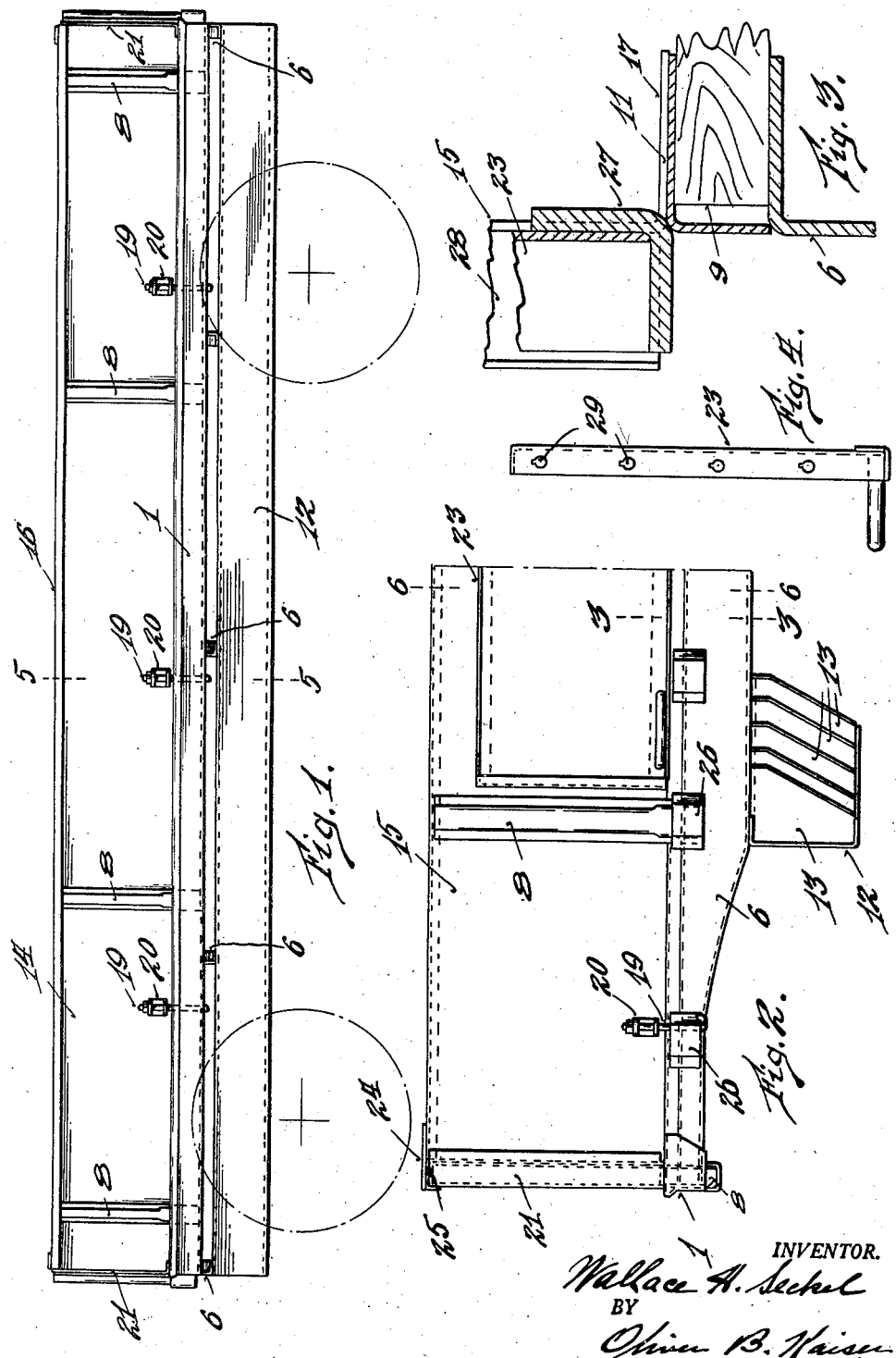

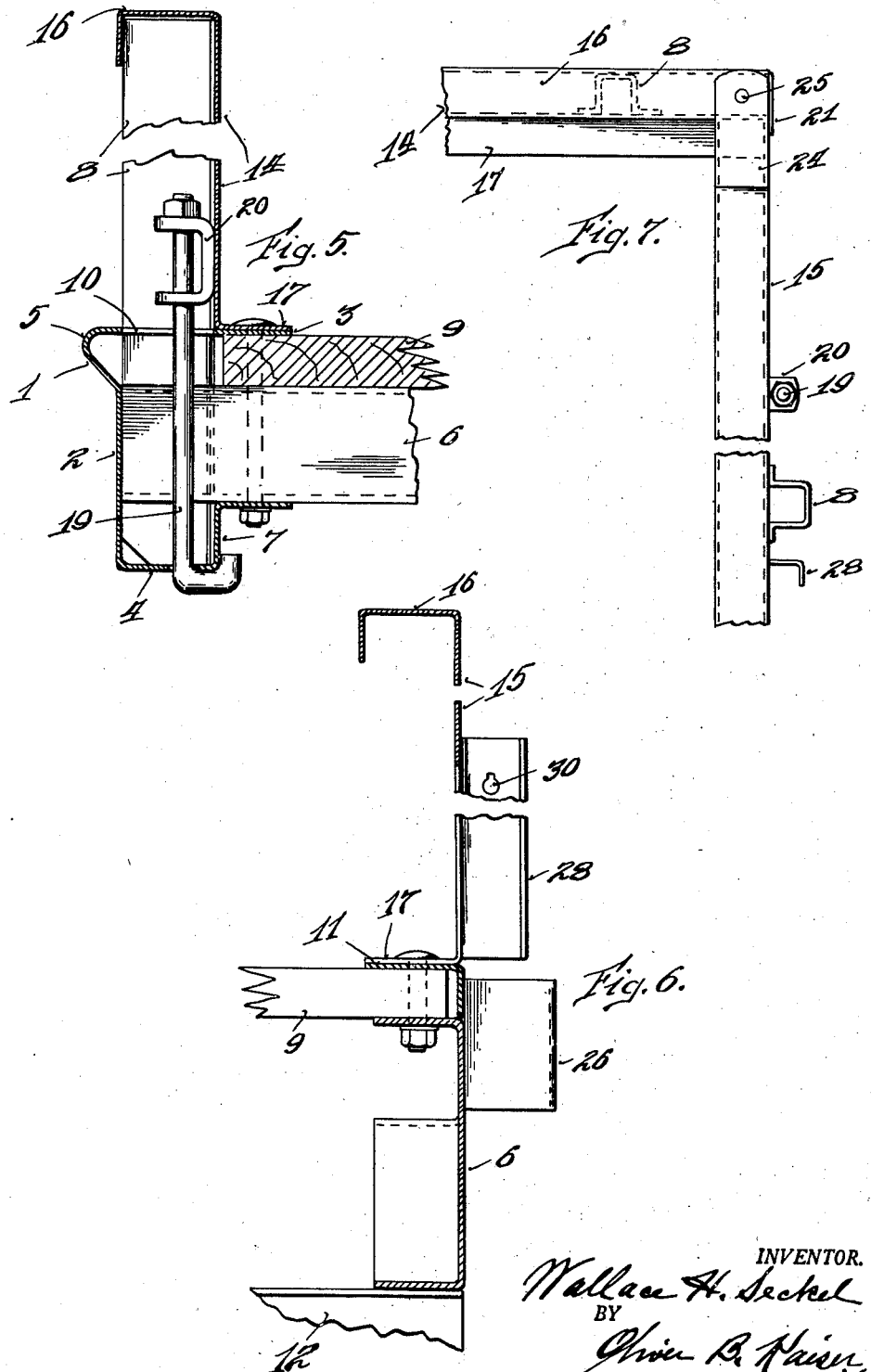

2,451,880

UNITED STATES PATENT OFFICE 2,451,880

CARGO CARRYING VEHICLE BODY

Wallace H. Seckel, Galion, Ohio, assignor to The Perfection Steel Body Company, Galion, Ohio, a corporation of Ohio Application January 5, 1945, Serial No. 571,531

1 Claim. (Cl. 296—10)

This invention relates to improvements in cargo carrying vehicle bodies, commonly designated as a combination box, rack and flat bed or platform, convertible from one form to the other.

An object of the invention is to provide a box type of body for a cargo carrying vehicle, of simple, durable and low cost construction, comprising sheet metal panels for the sides and ends of the box, removably mounted upon a bed or platform by stakes respectively fixed to the panels and socketed into the platform together with means for quickly and securely anchoring the panels, at their base, to the platform.

Another object is to provide a wagon or vehicle box, composed of removable sheet metal panels installed upon a platform, the panels interlocked together at the corners of the box and top edges or rims thereof and the opposite ends of each of the end panels sustained and in bearing contact respectively with the relative ends of the side panels, for the full heighth thereof and thereby resistant to outward pressure and providing for a quick, convenient and secure assembly of the panels.

Another object is to provide a vehicle truck platform with a pair of side rails of channel form in cross-section longitudinally of the platform, joined by a series of determinately spaced bolsters having their opposite ends each respectively socketed into the channel of a side rail and rigidly secured thereto to combine the side rails and bolsters as a unit and the end bolsters of the series also providing end rails of the platform for sustaining the end panels or racks stationed upon the platform.

Another object is to provide a truck platform with a series of determinately spaced bolsters joined at their ends by side rails, the bolsters each rigidly secured to a pair of sills extending longitudinally of the platform, the sills, directly, rigidly fixed to the front and rear axles of the running gear of the vehicle, combining the platform and running gear into a flexible unit of advantage when the vehicle travels over or is stationed upon rough ground to avoid any one of the wheels to be elevated from the ground.

Various other features and advantages of the invention will be more fully set forth in the following description of the accompanying drawings, forming a part hereof and exemplifying a preferred embodiment, in which:

Figure 1 is a side elevation of the improved vehicle cargo carrying box type of body and portion of running gear associated therewith.

Figure 2 is an enlarged end view of the same, illustrating a half section thereof.

Figure 3 is an enlarged section on line 3—3, Figure 2.

Figure 4 is an end elevation of the closure gate for an opening in the rear end of the siding of the body.

Figure 5 is an enlarged section on line 5—5, Figure 1.

Figure 6 is an enlarged section on line 6—6, Figure 2, with the closure gate removed.

Figure 7 is a top plan view of a corner section of the siding of the body, rear end.

The present invention specifically is directed to the siding of a box type of vehicle cargo carrying body and generically to the combination of such type of body and running gear. The platform as a base or bottom of the body having utility independent of the siding, which is removable therefrom, therefore, individually as to certain of its characteristic forms the subject matter of an application separate hereof, Serial No. 561,139, Patent No. 2,447,471, August 17, 1948.

Referring to the drawings, the platform or bed comprises side rails 1, of extruded steel or otherwise fabricated bars of uniform cross-section, in general of channel form having a web portion 2 and a pair of opposite flanges 3, and 4, integrally joining with the web. The web provides an outer side facing or edge for the platform with the flange 3, extending at right angles thereto to bear upon the top or upper side of the platform. The web at its juncture with the flange 3, is rolled to provide an outwardly extending corrugation or ridge 5, as an auxiliary outside edge, reinforcing and increasing the rigidity of the bar and serving as a rub-rail.

The flange 4, for the bottom side of the frame is of off-set form in cross section, the off-set extending inwardly of the channel of the bar, providing a sill or ledge longitudinally of the bar or rail, for supporting an end of each of a series or plurality of determinately spaced bolsters 6, disposed cross-wise of the length of the platform. The off-setting of the flange 4, provides a shoulder 7, in parallelism with the web 2, and therewith, together with a portion of the flange intermediate of the shoulder and web forming a recess within the channel and longitudinally of the full length of the rail, for socketing and laterally confining the end of a stake 8, engaged into the rail and through a slot or opening 10, in the top flange 3, of the rail. The off-setting of the flange 4, further serves to reinforce and strengthen the rail, permitting a reduction in gauge of metal and inherently a reduction in the weight of platform, without sacrifice in durability or efficiency.

The structure of the rails permits the stake traversing openings or slot 10, to be located at any selected point and relative spacing apart for the full length of the rail, which is of material advantage, so that the number can be varied and the relative spacing changed to meet different demands.

The bolsters, for the understructure of the platform, constitute channel form of rails, each tapering toward its opposite ends for the bottom side of the bolster, the ends each respectively engaging into the channel of a side rail and rests upon the ledge thereof, formed by the off-set in the lower flange 4 of the rail. The tapering ends of the bolster reduce or lower the mounting heighth of the platform and offer better wheel clearance. The bolsters can be set at any relative spacing apart, depending upon the length of the platform and load sustaining capacity required, which is due to the uniform cross-sectional formation of the side rails. The ends of the bolsters may be either welded, riveted or otherwise rigidly secured to the side rails, to combine the rails and bolsters as a unit.

The end bolsters 6, of the series, respectively for the opposite ends of the platform, each has its web outward and in registry with the relative end of the side rails and thereby also serve as cross rails for the ends of the platform.

The flooring of the platform follows the general practice, as comprising wood board or planks 9, extending longitudinally of the platform and at their opposite ends respectively are capped by an angle bar or rail 11, as shown in Figure 6, bolted thereto and to the upper inturned flange of an end bolster. The margins of the end boards, as shown in Figure 5, extend beneath the top flange 3, of the side rails, respectively, and therewith bolted to the bolsters.

The bolsters are superimposed upon a pair of pressed steel sills 12, preferably of channel form in cross-section and extend longitudinally of the platform. The sills are rigidly secured to the bolsters by plates 13, each providing a combined gusset and brace, with the gusset portion fitting and engaged into the channel of the sill and welded, riveted or otherwise rigidly secured to the walls thereof.

The sills are set at an angle longitudinally of the body and running gear, to slightly converge toward each other for one or forward end of the vehicle and are directly and rigidly secured to the front and rear axles of the running gear, and may therefore constitute components of the running gear.

The body of the vehicle is of box form, consisting of a pair of side panels 14, and a pair of end panels 15, all of sheet metal, removably fixed upon and to the platform. The side panels are of duplicate construction. Each longitudinally of its upper end is bent at right angles to extend laterally from one side and then flanging downward to provide a rim 16, extending outward, while the lower end is bent at right angles to extend in an opposite direction from the rim to provide a flange 17, for the full length of the panel. The flange 17, marginally overlaps the end of the flange 3, of a side rail of the platform upon which the panel is stationed and holes supplied in this flange to clear the bolts securing the flooring to the rail and bolster.

The panel has a plurality of stakes 8, secured upon its outerside, four in number being shown, preferably welded thereto each having its head end tucked into and beneath the rim 16, and its lower end projecting beyond the base of the panel for socketing into a side rail of the platform.

The panel is anchored to a side rail of the platform by a plurality of bolts 19, each having a hook shaped head end, the shank thereof traversing the side rail preferably through a stake opening 10 through the upper flange 3 of the rail and thence through an elongated aperture in the bottom flange of the rail as a drainage slot for the channel and in registration with the stake opening, the hook end exposed to the exterior bottom side of the rail and in connection therewith.

The shank of the bolt 19, traverses a pair of ears of a bracket 20, fixed to the outer side of the panel. This provides a simple and efficient method for anchoring the panel to and upon a side rail of the platform and exposed to the exterior side of the panel. The number employed is optional although it has been experienced that three in number is sufficient, located intermediate of the stakes.

Each of the opposite ends of the side panels is protected against distortion by a coping plate 21, extending transversely across an end of the panel, preferably welded thereto, and extends slightly beyond the inner side thereof, to provide an overlapping abutment for a relative end of an end panel. The lower end of the coping plate at the exterior side of the panel is bent laterally to overlie the exterior side of the panel, to serve as a brace for the plate.

The front and rear end panels 15, are of substantially duplicate construction, excepting that the rear end panel is provided with a discharge opening covered by a closure gate 23.

The end panels, in cross-section, follow the side panels, excepting that the top rim extends inward, necessary, particularly for the rear panel, to permit the closure gate to be located on the outer side of the rear panel and slidable vertically to an open position or removed.

The ends of the side panels and end panels, at the corner junctures, respectively are locked together by a studded plate 24, fixed to the outer side of the rim of an end panel and projecting horizontally therefrom to overlap the end of the rim of an adjoining side panel, with the stud 25, protruding from the lower side of the plate 24, socketed into a registering aperture in the rim of the side panel.

The end panels are also provided with stakes 8, of a suitable number, ordinarily two have been found sufficient and the panel is anchored to an end bolster 6, similarly as the side panels by a pair of hook-headed bolts 19, having the head engaged with a stake bracket 26, fixed to the outer side of the bolster.

The closure gate 23, for the discharge opening through the rear panel is formed of sheet metal, having a rim thereabout formed by a lateral flange, and the lower edge is reinforced by an angle bar binding 27, with one of the flanges thereof overlapping the lower margin of the inside face of the gate. The reinforcing bar 27, in the closed position of the gate bear upon the end facing of the flooring or rail 11, as illustrated in Figure 3. The gate is slidably engaged between the guide rails 28, extending from the outer side of the rear end panel, at the opposite sides of the discharge opening, laterally confining the gate.

The rims for the opposite ends of the gate are provided with a series of aligned apertures 29, adapted to be brought into registry with an aperture 30, respectively at the upper end of each of the guide rails 28, for locking the gate either in its closed position and fractionally elevated or full open positions.

The side and end panels can be readily removed when it is desired to convert the body for different needs and uses, as for example, the platform clear of sides, commonly termed flat bed, while for other needs, particularly in the agricultural or farming field, in addition to the box type herein exemplified, as a hay rack, stock rack, etc.

The assembly of the grain box on the platform can be readily effected, by first installing the side panels, after which the front and rear panels are inserted in place and locked at their rims to the side panels. The front and rear end panels are held in place against outward pressure at the corners, by the projecting margin of the coping plates 21, fixed to the ends of the side plates.

The body is exceedingly light in weight, durable, sturdy, of low cost manufacture and flexible without injury, therefore self-accommodating to yield in travel over rough ground, so that the wheels at all times will maintain ground contact. It is adaptable for manufacture in extreme lengths for material increase in load carrying capacity, therefore can be made to various sizes without change in detail of construction.

Having described my invention, I claim:

A body of a cargo carrying vehicle, comprising: a platform having a side rail of channel form in cross section for each of the opposite sides of the platform with the flanges of each rail extending inwardly in the plane of the platform, the top flange thereof having apertures therethrough at intervals longitudinally of the rail, each for traversing an end of a stake for making a socket connection with the rail, the bottom flange terminating with a right angled bend extending inwardly of the channel forming a shoulder longitudinally of the rail in spaced parallelism with the web of the rail and therewith providing a socket for the ends of the stakes, side panels of sheet metal each respectively sustained upon a relative side rail of the platform and at its base end having a lateral flange extending from the inner side of the panel longitudinally thereof and bearing upon the top flange of the rail and bolts mounted upon the outer side of the panel, each having its shank traversing an aperture in each of the flanges of the rail with its head end in anchoring connection with the outside of the bottom flange of the rail.

WALLACE H. SECKEL.

REFERENCES CITED

The following references are of record in the file of this patent:

UNITED STATES PATENTS

| Number | Name | Date |
|---|---|---|
| 187,453 | Burr | Feb. 20, 1877 |
| 345,577 | Davis | July 13, 1886 |
| 556,345 | Geisel | Mar. 17, 1896 |
| 765,085 | Lanpher | July 12, 1904 |
| 934,048 | Cross | Sept. 14, 1909 |
| 1,228,138 | Rogers | May 29, 1917 |
| 1,402,146 | Davis | Jan. 3, 1922 |
| 1,425,596 | Kramer | Aug. 15, 1922 |
| 1,462,996 | Allen et al. | July 24, 1923 |
| 1,708,639 | Styslinger | Apr. 9, 1929 |
| 1,904,031 | Reeves | Apr. 18, 1933 |
| 2,022,869 | Reid | Dec. 3, 1935 |
| 2,054,122 | Eisenberg, Jr. | Sept. 15, 1936 |
| 2,115,440 | Black | Apr. 26, 1938 |